United States Patent
Cole et al.

(10) Patent No.: US 10,802,480 B2
(45) Date of Patent: Oct. 13, 2020

(54) SUBMERSIBLE INSPECTION DEVICE AND REDUNDANT WIRELESS COMMUNICATION WITH A BASE STATION

(71) Applicant: ABB Power Grids Switzerland AG, Baden (CH)

(72) Inventors: Gregory A. Cole, West Hartford, CT (US); William J. Eakins, Bloomfield, CT (US); Daniel T. Lasko, Bloomfield, CT (US); Harshang Shah, Bloomfield, CT (US); Thomas A. Fuhlbrigge, Ellington, CT (US); Carlos Morato, Avon, CT (US); Biao Zhang, West Hartford, CT (US); Luiz V. Cheim, St. Charles, MO (US); Poorvi Patel, Ballwin, MO (US); Andrew Salm, West Hartford, CT (US)

(73) Assignee: ABB Power Grids Switzerland AG, Baden (CH)

( * ) Notice: Subject to any disclaimer, the term of this patent is extended or adjusted under 35 U.S.C. 154(b) by 134 days.

(21) Appl. No.: 15/833,916

(22) Filed: Dec. 6, 2017

(65) Prior Publication Data
US 2018/0157251 A1     Jun. 7, 2018

Related U.S. Application Data

(60) Provisional application No. 62/431,338, filed on Dec. 7, 2016.

(51) Int. Cl.
*G05D 1/00*     (2006.01)
*H04B 1/69*     (2011.01)
(Continued)

(52) U.S. Cl.
CPC .......... *G05D 1/0022* (2013.01); *B63G 8/001* (2013.01); *B63G 8/24* (2013.01); *G05D 1/0077* (2013.01);
(Continued)

(58) Field of Classification Search
CPC ...... G05D 1/0022; G05D 1/0077; H04B 1/69; H04B 2201/70715; H04B 2201/696;
(Continued)

(56) References Cited

U.S. PATENT DOCUMENTS

| | | | |
|---|---|---|---|
| 10,388,163 B2 * | 8/2019 | Nordbruch | G08G 1/142 |
| 2007/0126552 A1 * | 6/2007 | Fitzgibbon | G08C 17/02 340/5.71 |

(Continued)

*Primary Examiner* — Basil T. Jos
(74) *Attorney, Agent, or Firm* — Sage Patent Group (57) ABSTRACT

A submersible inspection device used for inspection of, for example, liquid cooled electrical transformers can include a number of separate cameras for imaging the internal structure of the transformer. The submersible can be configured to communicate to a base station using a number of wireless transmitters and receivers. Signals transmitted to the submersible include command signals useful to effect an action on the submersible but also a heartbeat signal to indicate health of the transmitted signal. A redundant channel selection logic is provided to switch from a channel which no longer receives a heartbeat to another channel that includes a current heartbeat. Multiple signals can be received and evaluated in software, and another signal received via a firmware radio.

27 Claims, 4 Drawing Sheets

(51) Int. Cl.
   *G08C 17/02* (2006.01)
   *H04W 72/02* (2009.01)
   *B63G 8/24* (2006.01)
   *B63G 8/00* (2006.01)

(52) U.S. Cl.
   CPC ............... *G08C 17/02* (2013.01); *H04B 1/69* (2013.01); *H04W 72/02* (2013.01); *B63G 2008/005* (2013.01); *G08C 2201/51* (2013.01); *G08C 2201/60* (2013.01); *H04B 2201/696* (2013.01); *H04B 2201/70715* (2013.01)

(58) Field of Classification Search
   CPC ............... G08C 17/02; G08C 2201/51; G08C 2201/60; H04W 72/02; B63G 8/24; B63G 8/001; B63G 2008/005
   See application file for complete search history.

(56) References Cited

U.S. PATENT DOCUMENTS

| | | | | |
|---|---|---|---|---|
| 2007/0233330 | A1* | 10/2007 | Beutler | G05D 1/0077 |
| | | | | 701/3 |
| 2014/0345511 | A1* | 11/2014 | Rikoski | B22D 31/00 |
| | | | | 114/259 |
| 2015/0032293 | A1* | 1/2015 | O'Neill | B25J 13/006 |
| | | | | 701/2 |
| 2017/0192427 | A1* | 7/2017 | Bivans | G05B 19/0421 |

* cited by examiner

SUBMERSIBLE INSPECTION DEVICE AND REDUNDANT WIRELESS COMMUNICATION WITH A BASE STATION

TECHNICAL FIELD

The present invention generally relates to wireless communication with a submersible inspection device, and more particularly, but not exclusively, to redundant wireless communication with submersible inspection drones used to evaluate electrical transformers.

BACKGROUND

Providing the ability to select a healthy wireless channel from among a plurality of channels on a remotely operated submersible remains an area of interest. Some existing systems have various shortcomings relative to certain applications. Accordingly, there remains a need for further contributions in this area of technology.

SUMMARY

One embodiment of the present invention is a unique submersible for inspection of a liquid filled housing such as an electrical transformer. Other embodiments include apparatuses, systems, devices, hardware, methods, and combinations for redundantly receiving wireless signals to submersible drone. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
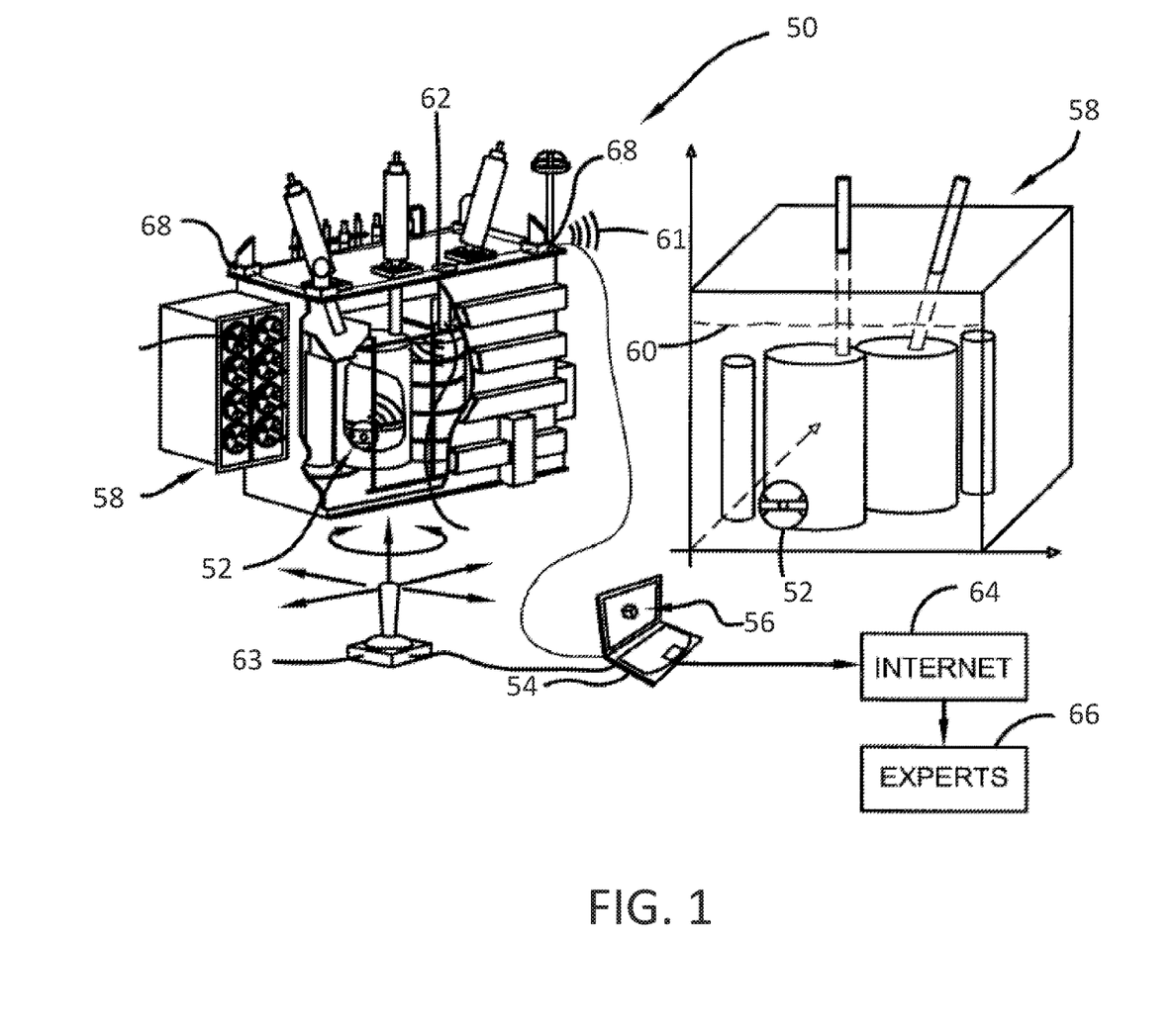
FIG. 1 depicts an embodiment of a submersible drone communicating with a base station.

With reference to FIG. 1, there is illustrated a system for in-situ inspection designated generally as 50. The system 50 generally includes an inspection device in the form of a submersible remotely operated vehicle (ROV) 52 which is wirelessly controlled from a control station which, in the illustrated embodiment, includes a computer 54 and a display 56. As used herein, the term "submersible" includes, but is not limited to, a vehicle capable of operation under the surface of a liquid body. Although much of the description that follows utilizes the term ROV for sake of brevity, it will be understood that the various embodiments described herein are not strictly limited to remotely operated vehicles, but can also be utilized with autonomous submersibles as well such as but not limited to those that are remotely triggered but are otherwise autonomous. For example, the inspection devices described herein can be static devices that observe and collect data whether remotely operated or in an autonomous configuration. Such a static device can be placed in its location as a result of operation of the ROV or autonomous device. Thus, embodiments of the device 52 are intended to cover a broad range of devices not simply limited to ROVs unless otherwise indicated to the contrary (as one non-limiting example, use of the term 'drone' is capable of covering ROV as well as autonomous devices 52 or static inspection drones useful for monitoring and/or inspection duties).

Of note in FIG. 1, the system 50 includes components generally on the left and bottom side of the figure, with the components on the upper right representing a schematic model of certain aspects of the system 50 (e.g. the tank in which the ROV 52 is operating) which will be understood by those of skill in the art. In many forms the submersible vehicles described herein are capable of operating in a container which maintains a fluid such as a pool or chemical storage tank, but in other forms can be a sealed container such as a tank. The liquid can take any variety of forms including water, but other liquid possibilities are also contemplated. By way of example, and not limitation, the submersible vehicles described herein may be performed on/in portions of ship hulls, electrical interrupters, high voltage switch gears, nuclear reactors, fuel tanks, food processing equipment, floating roof storage system, chemical storage tank or other apparatuses of similar nature.

The submersible ROV 52 shown in the illustrated embodiment is being used to inspect a tank for a transformer 58, but other applications are contemplated herein. Skilled artisans will appreciate that the inspection typically, but not exclusively, occurs only when the transformer 58 is offline or not in use. In many embodiments the transformer 58 utilizes its liquid as a cooling fluid 60 to maintain and disburse heat generated by the internal components during operation of the transformer. The cooling fluid 60 can be any liquid coolant contained within an electrical transformer, such as but not limited to a liquid organic polymer. Such liquid can therefore be transformer oil, such as but not limited to mineral oil. In other forms the transformer liquid can be pentaerythritol tetra fatty acid natural and synthetic esters. Silicone or fluorocarbon-based oils can also be used. In still other forms a vegetable-based formulation, such as but not limited to using coconut oil, may also be used. It may even be possible to use a nanofluid for the body of fluid in which the robotic vehicle is operating. In some embodiments, the fluid used in the transformer includes dielectric properties. Mixtures using any combination of the above liquids, or possibly other liquids such as polychlorinated biphenyls may also be possible.

As skilled artisans will appreciate, the transformer 58 is typically maintained in a sealed configuration so as to prevent contaminants or other matter from entering. As used herein, a "sealed configuration" of the tank allows for sealed conduits and/or ducts to be associated with the transformer's tank or housing to allow for connection to the electrical components and/or monitoring devices maintained in the tank. The tank is also provided with at least one opening to allow for the filling and/or draining of the cooling fluid. As shown in FIG. 1, a hole 62 can be an existing service hole, e.g. those used for filling the transformer oil and/or those used to enter a tank upon servicing by a technician. In general operation, the oil is inserted through any number of holes located in the top of the tank. Holes 62 may also be provided at the bottom of the tank to allow for the fluid to be drained. The holes 62 are provided with the appropriate plugs or caps. In some embodiments the hole 62 can be sized and structured such that the transformer tank top need not be unsealed completely or at all to introduce the submersible ROV 52. Accordingly, it will be appreciated that the size of the inspection device can be such that it can fit within a designated hole, whether the hole is the hole 62 depicted in the illustration or other types of access points discussed elsewhere herein and/or appreciated by those of skill in the art.

The ROV 52 is insertable into the transformer 58 or sealed container and is contemplated for purposes of the various embodiments herein as being movable utilizing un-tethered, wireless remote control. In the illustrated embodiment the computer 54 (depicted as a laptop computer in the illustrated embodiment although other appropriate computing devices are also contemplated) is contemplated to be in wireless communication with the ROV 52. A motion control input device, such as a joystick 63 is connected to the computer 54 and allows for a technician to control movement of the device 52 inside the transformer 58. Such control can be by visual awareness of the technician and/or by information made available via the display 56 (such as, but not limited to, a virtual model of the transformer 58). Other types of motion control input devices, such as used in video games, handheld computer tablets, computer touch screens or the like may be employed.

In some embodiments the computer 54 can be connected to another computer via a network, such as the depicted internet 64 as one example, so as to allow for the images or sensor data to be transferred to experts, who may be remotely located, designated by the block 66 so that their input can be provided to the technician so as to determine the nature and extent of the condition within the transformer and then provide corrective action as needed. In some embodiments, control of the ROV can also be transferred to an expert, who may be remotely located. In such embodiments, the expert would have another computer that can send control signals via a network to the local computer 54 that in turn sends signals to control the device 52 as described above.

The transformer 58 may be configured with a plurality of signal transmitters and/or receivers 68 mounted on the upper corners, edges or other areas of the transformer 58, or in nearby proximity to the transformer. The transmitters and/or receivers 68 are structured to send and/or receive a wireless signal 61 from the inspection device to determine the position of the inspection device in the transformer tank. It will be appreciated that in some forms the transmitter and/or receiver 68 can include any number of separate transmitter and/or receiver pairings to accommodate a similar number of transmitter and/or receivers that may be used in the ROV 52 for redundancy, some embodiments of which will be described further below. It will be appreciated given the disclosure herein that mention of transmitter and/or receiver 68 can refer to multiple separate transmitters and/or receivers that are paired with a corresponding transmitter and/or receiver on the ROV.

The transmitters and/or receivers 68 can be a transceiver in one embodiment, but can include a transmitter and antenna that are separate and distinct from one another in other embodiments. For example, the transmitter can be structured to send information using different frequencies/modulation/protocols/etc than an antenna is structured to receive. Thus as used herein, the term "transmitter" and "antenna" can refer to constituent parts of a transceiver, as well as standalone components separate and apart from one another. No limitation is hereby intended unless explicitly understood to the contrary that the term "transmitter" and/or "antenna" are limited to stand alone components unless otherwise indicated to the contrary. Furthermore, no limitation is hereby intended that the use of the phrase "transmitters and/or receivers" must be limited to separate components unless otherwise indicated to the contrary.

Informational data gathered by the ROV 52, and any associated sensor, can be transmitted to the computer 54 through the fluid and the tank wall with the openings 62. Use of different communication paths for difference aspects of the operation of the ROV 52 may be used to prevent interference between the signals. Some embodiments may utilize the same communication path to transfer data related to positioning, data information, and control information as appropriate.

Figure 2:
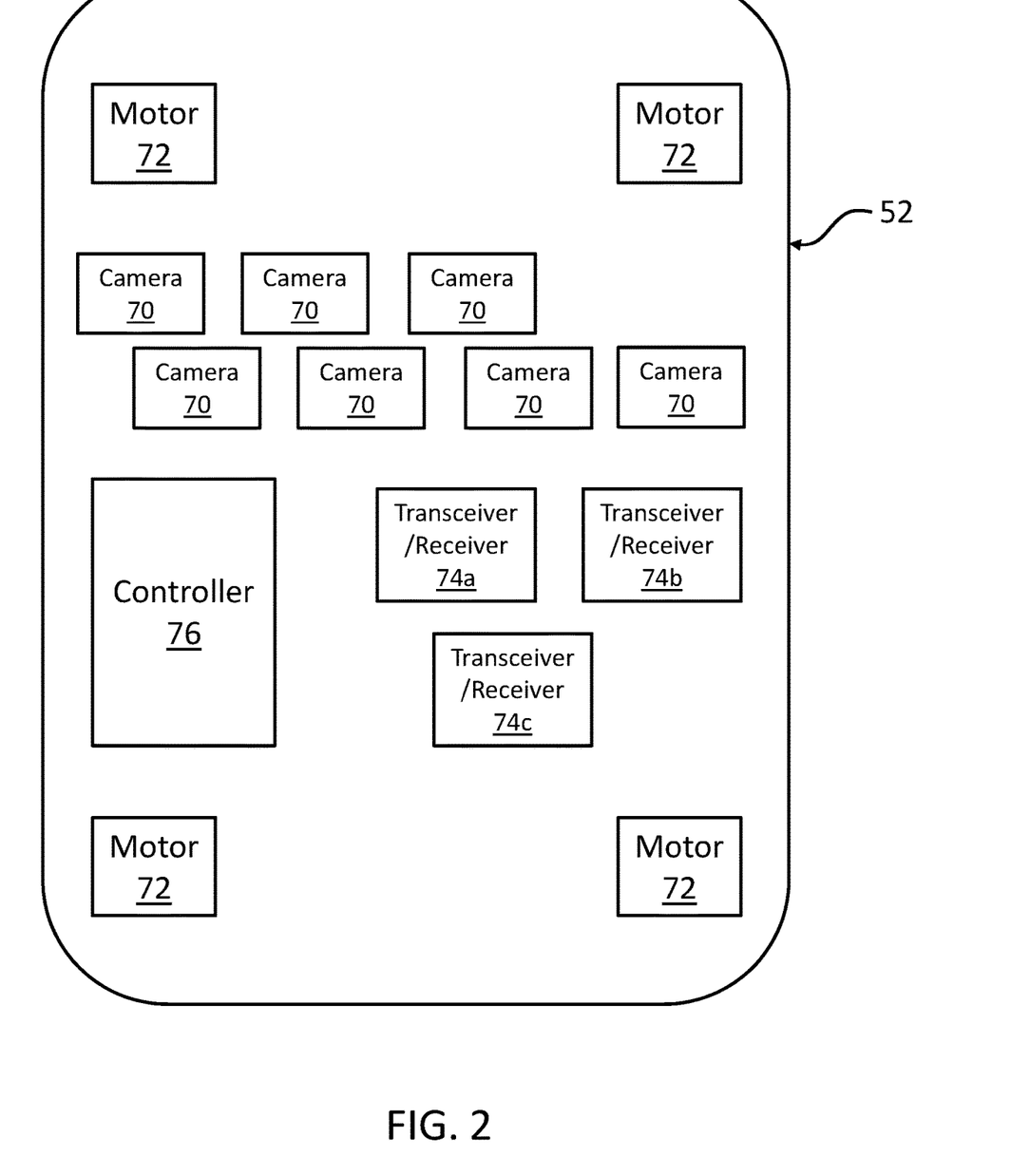
FIG. 2 depicts one embodiment of the submersible device.

Turning now to FIG. 2, one embodiment of the ROV 52 is depicted as including cameras 70, motors 72 and transmitter and/or receivers 74a, 74b, and 74c. Although three separate transmitter and/or receivers are shown, any number greater than or less than those depicted can be used. Other components may also be included in the ROV but are not illustrated for sake of brevity (e.g. a battery to provide power to the cameras, additional sensors such as rate gyros or magnetometers, etc). The cameras 70 are utilized to take visible and other wavelength images of the internal components of the transformer. In one embodiment of the ROV 52 a number of cameras are fixed in orientation and do not have separate mechanisms (e.g. a servo) two change their point of view. In other embodiments all cameras the ROV 52 have a fixed field of view and not otherwise capable of being moved. These images allow for technicians to monitor and inspect various components within the transformer. The cameras 70 can take on any variety of forms including still picture and moving picture cameras (e.g. video camera). Any number and distribution of the cameras 70 are contemplated. In one form ROV 52 can have an array of cameras 70 distributed in one region, but in other forms the cameras 70 can be located on all sides of the ROV 52. In some embodiments, the ROV 52 is provided with lights which facilitate illumination of the area surrounding the inspection device 52. In some embodiments the lights are light emitting diodes, but it will be appreciated that other illumination devices could be used. The illumination devices are oriented so as to illuminate the viewing area of one or more of the cameras 70. In some embodiments, the user can control the intensity and wavelength of the light.

The motors 72 are used to provide power to a propulsor (e.g. an impeller) which are used to control and/or provide propulsive power to the ROV 52. Each motor 72 can be reversible so as to control the flow of fluid or oil through the flow channels. Each motor can be operated independently of one another so as to control operation of an associated propulsor (e.g. a thruster pump) such that rotation of the pump in one direction causes the liquid to flow through the flow channel in a specified direction and thus assist in propelling ROV 52 in a desired direction. Other configurations of the propulsor are also contemplated beyond the form of a propeller mentioned above, such as a paddle-type pump which could alternatively and/or additionally be utilized. In some embodiments, a single motor may be used to generate a flow of fluid through more than one channel. In other words, a housing of the ROV 52 could provide just one inlet and two or more outlets. Valves maintained within the housing could be used to control and re-direct the internal flow of the fluid and, as a result, control movement of the ROV 52 within the tank. Fluid flow from the motor can also be diverted such as through use of a rudder, or other fluid directing device, to provide the steerage necessary to manipulate the vehicle. By coordinating operation of the motors and/or valves and/or fluid directing device with a controller, the inspection device can traverse all areas of the transformer through which it can fit. Moreover, the ROV 52 is able to maintain an orientational stability while maneuvering in the tank. In other words, the ROV 52 can be stable such that it will not move end-over-end while moving within the transformer tank.

Any one of the transmitter and/or receivers 74a, 74b, and 74c can be connected to a controller on board the ROV 52 for the purpose of transmitting data collected from the cameras 70 and also for sending and receiving control signals for controlling the motion and/or direction of the ROV 52 within the transformer. The transmitter and/or receivers 74a, 74b, and 74c are structured to generate a wireless signal that can be detected by the computer or any intermediate device, such as through reception via the transmitters and/or receivers 68 (although only two are depicted in FIG. 1, it will be appreciated that another transmitter and/or receiver 68 is also used to accommodate the three separate transmitters and/or receivers 74a, 74b, and 74c in the embodiment depicted in FIG. 2).

Other aspects of an exemplary remotely operated submersible which is operated in a fluid filled transformer tank described in FIG. 1 or 2 are described in international application publication WO 2014/120568, the contents of which are incorporated herein by reference.

Referring now to FIGS. 1 and 2, transmissions from any of the pairings of transmitters and/or receiver 68 and transmitter and/or receivers 74a, 74b, and 74c can occur over a variety of manners, including various frequencies, powers, and protocols. In some applications the communication between the ROV 52 and the base station can be supplemented with a repeater or relay station, but not all embodiments need include such devices. The manners of transmission between any of 68's and 74a/74b/74c need not be identical in all embodiments. To set forth just a few examples, the transmitter and/or receiver 68 used for broadcast of signals from the base station can transmit in power that ranges from 1 W to 5 W. The base station can also transmit in frequencies that that range from about 300 MHz to about 5 GHz, and in some forms are at any of 300 MHz, 400 MHz, 433 MHz, 2.4 GHz, and 5 GHz. Transmission can occur using any variety of protocols/formats/modulation/ etc. In one example, transmission from the base station can use digital radio communications such as that used for RC model cars/boats/airplanes/helicopters. The transmission can also occur as TCP/IP or UDP, it can occur over WiFi radios, serial communication over Bluetooth radios, etc. In one particular form, video transmissions can occur as streaming for a Wi-Fi camera over 2.4 GHz.

In much the same manner as the transmitters and/or receivers 68 of the base station, the transmitters and/or receivers of the ROV 52 can transmit in power that ranges from 250 mW to 3 W. The base station can also transmit in frequencies that that range from about 300 MHz to about 5 GHz, and in some forms are at any of 300 MHz, 400 MHz, 433 MHz, 2.4 GHz, and 5 GHz. Transmission can occur using any variety of protocols/formats/modulation/etc. In one example, transmission from the base station can use digital radio communications such as that used for RC model cars/boats/airplanes/helicopters. The transmission could be video over IP, and one embodiment of IP could be WiFi/WLAN. In one non-limiting embodiment the transmission can therefore occur as TCP/IP or UDP, it can occur over WiFi radios, serial communication over Bluetooth radios, etc. In one particular form, video transmissions can occur as streaming for a Wi-Fi camera over 4.2 GHz. In short, a variety of transmission techniques/approaches/protocols/frequencies/etc are contemplated herein.

The submersible 52 illustrated in FIG. 2 also includes a controller 76 which can be used to receive a command and provide a control signal to a useful component of the submersible 52. For example, the controller 76 can be used to activate one or more motors 72, cameras 70, and/or one or more additional sensors. The controller 76 can also be used to activate a ballast system, either of the emergency type or an active ballast system used to control depth under the liquid surface. The controller 76 can be comprised of digital circuitry, analog circuitry, or a hybrid combination of both of these types. Also, the controller 76 can be programmable, an integrated state machine, or a hybrid combination thereof. The controller 76 can include one or more Arithmetic Logic Units (ALUs), Central Processing Units (CPUs), memories, limiters, conditioners, filters, format converters, or the like which are not shown to preserve clarity. In one form, the controller 76 is of a programmable variety that executes algorithms and processes data in accordance with operating logic that is defined by programming instructions (such as software or firmware). Alternatively or additionally, operating logic for the controller 76 can be at least partially defined by hardwired logic or other hardware.

Figure 3:
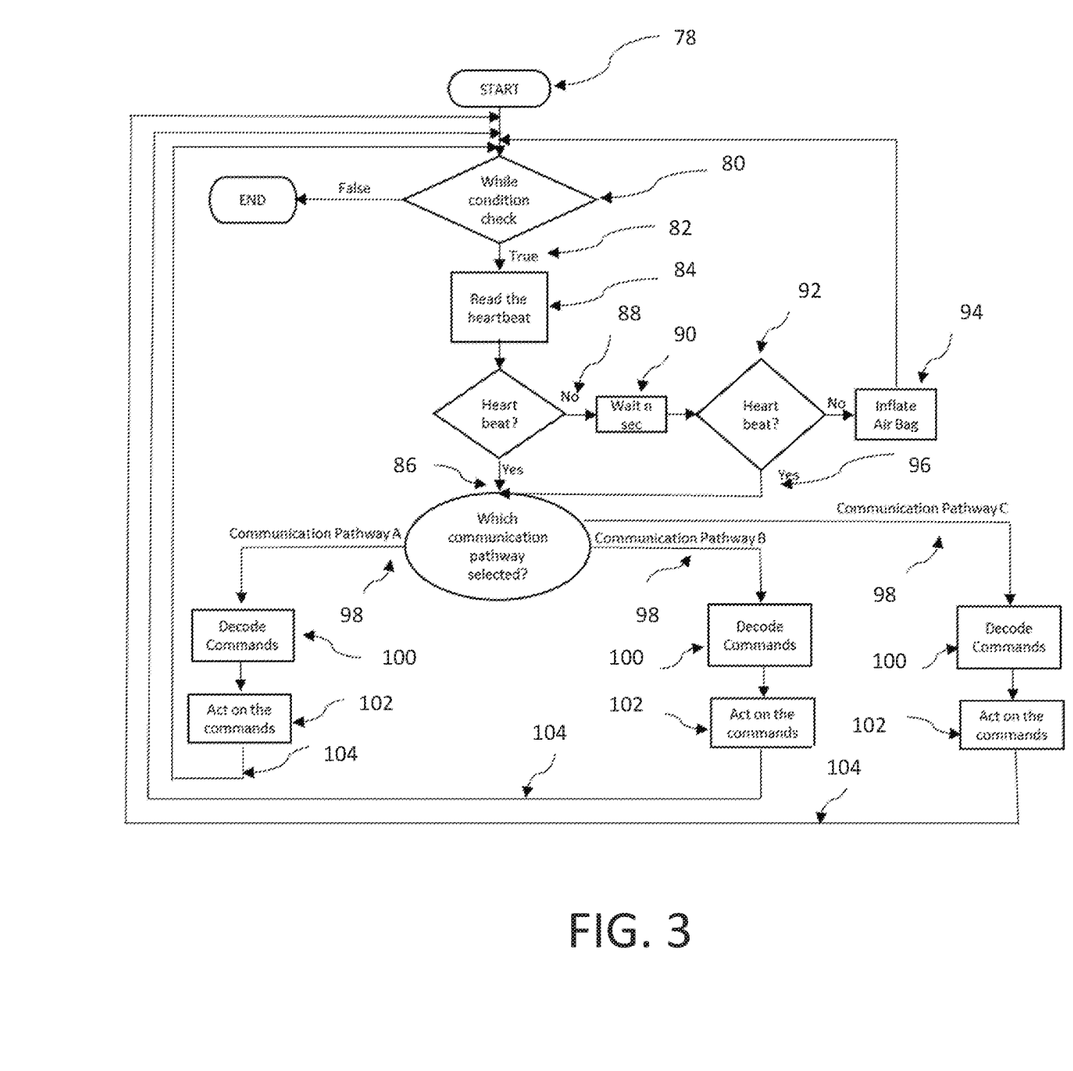
FIG. 3 depicts operating logic to select a current channel.

Turning now to FIG. 3, one embodiment of a controller for providing redundant control pathways to the useful components of the submersible 52 (e.g. the motors, cameras, sensors, ballast system) is illustrated. The redundant control scheme illustrated and described in FIG. 3 also includes a dual purpose of activating an emergency ballast system if the separate control channels are disrupted for some reason (hardware failure, transmission interference, etc) as will be described further below.

The operating logic starts at 78 at the top of FIG. 3 which receives three separate signals from the receivers 74a, 74b, and 74c (in other embodiments additional signals can also be received and acted upon by the redundancy logic described herein). In one non-limiting embodiment, the three separate signals include redundant control signals for one or more components of the submersible 52. In addition to the redundant control signals, the separate signals also include a heartbeat or similar signal that indicates the active and ongoing broadcasting of information. As will be appreciated, heartbeat signals or the like are useful to distinguish between fresh and active commands from a base station and those signals that are either stale, dead, or interfered, among other possibilities. A heartbeat can be used to determine the health of the signal and whether to rely upon the signal or chose another, redundant signal in its stead.

The operating logic of FIG. 3 evaluates a first communication pathway, and if no heartbeat is received in a limited amount of time, switches to evaluating a second communications pathway. If a heartbeat is not received in the second communications pathway, then the logic switches to evaluating the third communications pathway. If no heartbeat is received in the third pathway, then the operating logic activates a ballast (in this case, it is an inflatable bag) for subsequent recovery of the device 52. Each of the communications pathway represents signals received from each of the separate transmitters and/or receivers 74a, 74b, and 74c.

After the start at reference numeral 78, the logic checks that the while condition 80 is true, which is generally the case during operation of the submersible 52. If true at 82, then at block 84 the operating logic will read the heartbeat of the currently selected channel. The currently selected channel starts at Channel A by default, but if Channel A fails for some reason then the operating logic selects Channel B as the currently selected channel, and so forth. Once the heartbeat is read at 84 the operating logic determines whether the heartbeat is detected at 86 or not detected at 88. A heartbeat can be 'detected' using any number of different techniques, one of which is to compare a counter in the heartbeat to a previous counter value in the signal to determine if the signal has changed. Other techniques are also contemplated to detect an ongoing and valid signal. The heartbeat detection technique can be similar across all three channels, but in some embodiments the heartbeat detection technique can be different. The operating logic, therefore, can employ a channel specific heartbeat detection approach based upon the current channel being evaluated in the logic.

If the heartbeat is not detected at 88, the operating logic is structured to wait for a set amount of time at 90. The set amount of time can be the same across the different channels, or can be a variable. After the set amount of time at 90 has elapsed, the heartbeat is checked again at 92. As stated previously, if no heartbeat is detected in Channel A then Channel B is selected, and if no heartbeat is detected in Channel B then Channel C is selected (and so on), and thereafter is no heartbeat is detected in Channel C at 92 then a command is given at 94 to activate the emergency ballast (in the illustrated embodiment, the emergency ballast is an inflatable bag). It will be appreciated that the logic progresses through each of the channels (however many channels are used in any given embodiment) and only in the last channel if no heartbeat is received then the emergency system is activated.

However, if the heartbeat is again detected at 96, then, depending on the communication pathway selected at 98, the operating logic begins to decode the command at 100 and act on the command at 102 before restarting the logic again at 104.

The operating logic of FIG. 3 can be implemented in a number of different manners whether software or hardware or both, and can be contained within a single components or distributed among a number of different components akin to the discussion of the nature of a controller discussed above. To set forth one embodiment of the operating logic of FIG. 3, a schematic of a controller 76 is shown in FIG. 4 which includes several different components all operating together to detect a heartbeat in a relevant signal and select the channel that commands will be derived from.

Figure 4:
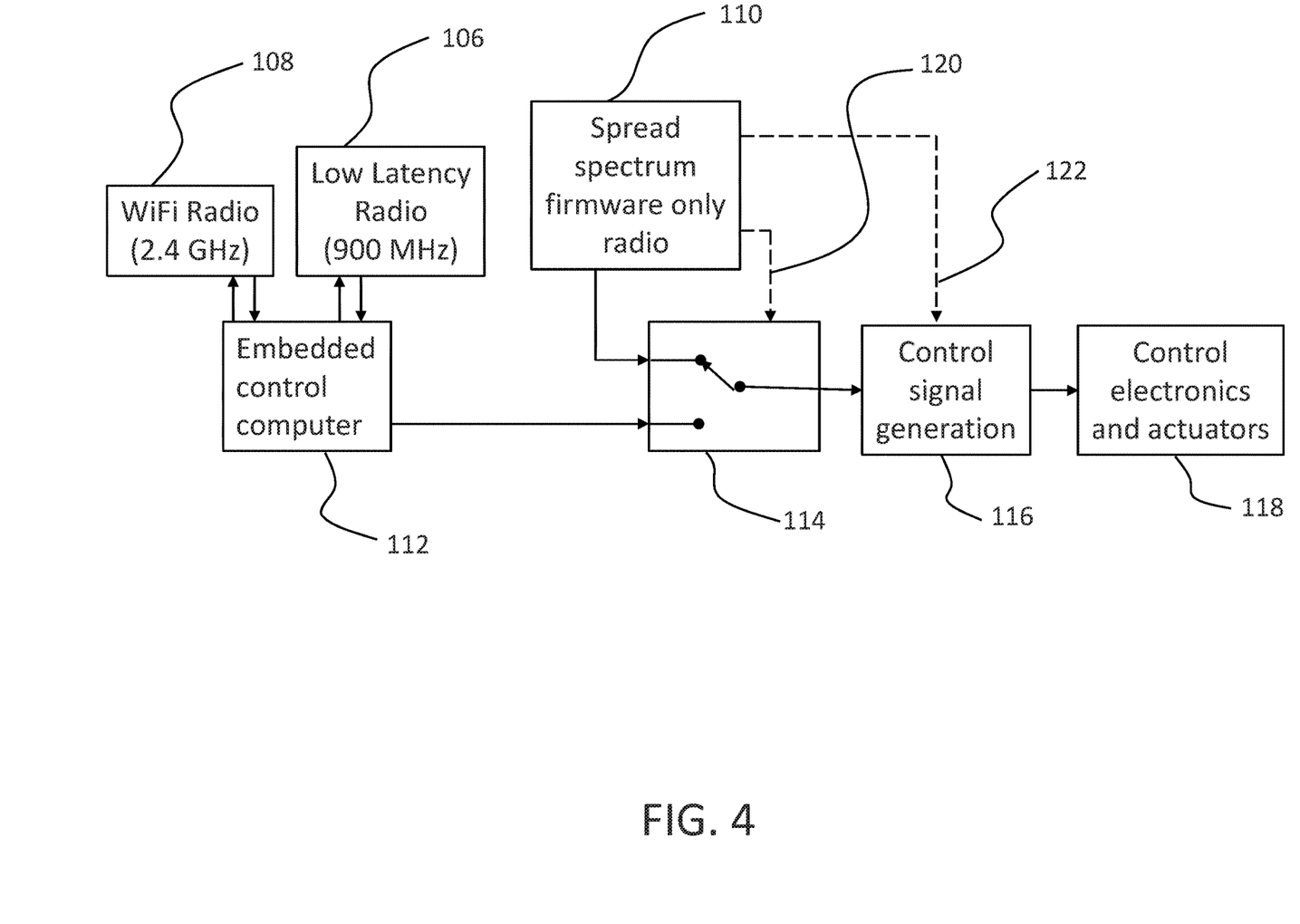
FIG. 4 depicts a schematic of one embodiment in which a plurality of radios are used in the submersible inspection device.

FIG. 4 depicts an embodiment which includes a low latency radio 106, WiFi radio 108, and spread spectrum radio 110. Each of the radios 106, 108, and 110 represent one of the channels A, B, and C depicted in FIG. 3. In the illustrated embodiment the low latency radio 16 is the preferred Channel A radio, the WiFi radio 108 is the next preferred Channel B radio, and the spreads spectrum radio 110 is the third preferred Channel C radio.

Signals received from the radios 106 and 108 are received and acted upon in the embedded control computer 112. In turn, the embedded control computer 112 can also transmit information back to the base station through the radios 106 and 108.

A switch 114 is used to select between information provided by the embedded control computer 112 and the spread spectrum radio 110. The switch 114 can be a solid state device which is used to provide the selected information to the control signal generation block at 116 which, in one embodiment, is implemented in firmware much like the spread spectrum radio 110. The control signal generation will forward along a control signal to the control electronics and actuators at block 118 which, in some embodiments, can be similar to block 100 on FIG. 3.

Dotted lines 120 and 122 are shown in FIG. 4 and represent a heartbeat signal from the spread spectrum radio 110. The switch 114 can use the heartbeat 120 to alternatively activate the switch to change from sampling the radio 110 or the signal from the embedded computer 112. The heartbeat 122 can be used within the control signal generation as it assesses which channel to use as the current channel.

The heartbeat comparison and signal forwarding of the embodiment set forth in FIG. 4 can be implemented in a number of different manners. For example, the embedded control computer 112 can evaluate the heartbeat from radio 106 and select radio 108 if no heartbeat in 106, and from there provide the signal to the switch 114. The switch 114 can feed the signal selected from either the control computer 112 or the radio 110 to the control signal generation 116 for further assessment whether the hierarchy of channels includes a heartbeat in order from preferred channel to least preferred channel, and if so which one of the hierarchy. In this sense, the control signal generation 116 may be given information about the radio 110 even though the preferred channel 106 includes an active heartbeat.

In another embodiment, the control computer 112 can multiplex the radio signals from 106 and 108 together and provide the multiplexed signal to the solid state switch 114, which provides a mux'ed version to the block 116 which evaluates the heartbeat and selects the current channel based on the heartbeat. Any number of variations are contemplated with the software embedded computer 112, firmware radio 110 and control signal generation 116, and solid state device 114 (and possible solid state devices 118).

As will be appreciated, the reception and evaluation of the heartbeat of the different radios 106, 108, and 110 can occur concurrent or contemporaneous with one another. In one embodiment each of the radios are configured to always be monitoring for a reception of incoming wireless signal, and information from the reception can be operated upon and routed according to the various embodiments described herein. As used herein, the terms 'concurrent' and/or 'contemporaneous' includes simultaneous reception and action upon the various signals, but also includes near simultaneous reception of and action in regards to the signals depending on, for example, the timeline and dynamics of the individual application. For example, a high performance submersible with tight constraints on rise time performance, settling times, etc may require tighter time intervals of reception and associated action even if the signals are not, strictly speaking, received and operated upon at the exact same time. Likewise, submersibles with relaxed performance requirements may include larger time intervals between the various signals as it relates to reception of signal and action based upon the signal. Each of these uses will be considered to be "concurrent" if various the requirements. Thus, the term "concurrent" includes exact simultaneous and near simultaneous One mode of operation of the system 50 that can be used in whole or in part to various embodiments described above progresses as follows: to ensure reliable communication between the device 52 and the computer 54, a transceiver 68 can be inserted into the cooling oil tank through the service opening on the top of the transformer. In most embodiments, the transceiver 68 is used to exchange data information from a sensor on the ROV and the camera 70, via a controller to the computer 54; and motion control or maneuvering signals from the joystick 63 via the computer 54 to the controller so as to operate the motors 72 and thrusters. The signal 84, transmitted by the receiver 82 is used by the computer 54 to provide a separate confirmation to the device's position within the tank.

The computer 54 receives the position signals and information signals and in conjunction with a virtual image correlates the received signals to the virtual image so as to allow a technician to monitor and control movement of the inspection device. This allows the technician to inspect the internal components of the transformer and pay particular attention to certain areas within the transformer if needed. By utilizing a virtual image of the internal features of the transformer and the position of the inspection device with respect to those virtual features, the image obtained can be matched with the corresponding site inside the actual transformer tank. Based on the visual representation of the transformer image and a possible virtual inspection device in relation to the image, a technician can manipulate the joystick 63 response. The computer 54 receives the movement signals from the joystick and transmits those wirelessly to the antenna 74, whereupon the controller implements internally maintained subroutines to control the pump thrusters to generate the desired movement. This movement is monitored in realtime by the technician who can re-adjust the position of the device 52 as appropriate.

During operation, the radio 106 is the desired pathway, where the user can operate the craft from the computer 54 with a standard GUI software and very low latency as the video is streamed back over WiFi radio 108. Should there be a breakdown or interruption of the 900 MHz low latency radio 106, but the WiFi radio signal 108 is still intact, control can be routed through the WiFi radio thought at a significantly increased latency. Should the WiFi radio 108 fail, such that the video stream is no longer available, control can either be routed through the low latency radio 106 with visualization from a wired camera placed on top of the transformer tank, or control can be routed through the spread spectrum radio 110 which, in one form, can be held by a person on top of the transformer.

One aspect of the present application includes an apparatus comprising a remotely operated submersible having: a first signal receiver structured to receive a first control transmission through a liquid environment from a remote control station, the first control transmission including a command and a heartbeat, a second signal receiver structured to receive a second control transmission through a liquid environment from a remote control station, the second control transmission including a command and a heartbeat, and a controller structured to use the command from the first signal receiver or the command from the second signal receiver to manipulate a system on the remotely operated submersible, the controller having a control circuit structured to use the command from the first signal receiver upon receipt of the heartbeat from the first control transmission and use the command from the second signal receiver upon receipt of the heartbeat from the second control transmission when the heartbeat from the first control transmission is no longer received.

A feature of the present application includes wherein the second signal receiver is a WiFi radio, and wherein the WiFi radio also structured to transmit image information to a base station.

Another feature of the present application includes wherein the image information is a moving image.

Still another feature of the present application further includes a third control receiver structured to receive a third control transmission through a liquid environment from the remote control station.

Yet another feature of the present application includes wherein the third control receiver is a spread spectrum radio.

Still yet another feature of the present application includes wherein the control circuit is further structured to use a command from the third signal receiver when the heartbeat from the first control transmission and the heartbeat from the second control transmission is no longer received.

Yet still another feature of the present application includes wherein the spread spectrum radio is a firmware only radio, and wherein the remotely operated submersible is configured to concurrently monitor the first control receiver, second control receiver, and the third control receiver.

Another aspect of the present application includes an apparatus comprising a robotic drone structured to be operated beneath the surface and within a body of liquid, at least two radio receivers structured to operate within the liquid and for receiving commands from a base station where the commands are used to effectuate an action of the robotic drone, a first radio receiver structured to receive a first command and the second radio receiver structured to receive a second command redundant to the first command, and a control circuit that uses the second command when the first command is determined to be invalid.

A feature of the present application includes wherein the first command is determined to be invalid when a heartbeat is no longer received from the first radio receiver.

Another feature of the present application includes wherein the second radio receiver is a WiFi radio structured to transmit outbound video images.

Still another feature of the present application further includes a third radio receiver structured to operate within the liquid and for receiving commands from a base station where the commands are used to effectuate an action of the robotic drone, the third radio receiver structured to receive a third command.

Yet another feature of the present application includes wherein the robotic drone is configured to concurrently monitor the first radio receiver, second radio receiver, and the third radio receiver.

Still yet another feature of the present application includes wherein the third command is redundant to the first command and to the second command, and wherein the control circuit further uses the third command when the first command is determined to be invalid.

Yet still another feature of the present application includes wherein the third radio receiver is a firmware radio, and wherein the control circuit of the first and second command is performed in an electronic circuit that carries out instructions of a computer program, and wherein the control circuit further extends to a hardware based evaluation of a heartbeat received from the third radio receiver.

Still another aspect of the present application includes a method comprising operating a remotely operated submersible in an interior of a transformer tank, receiving a first signal in the remotely operated submersible, the first signal including a first command and a first heartbeat, receiving a second signal in the remotely operated submersible, the second signal including a first command and a first heartbeat, using the first command to effectuate an action of the remotely operated submersible, wherein the first command is the same as the second command, and at a subsequent time to the using the first command, and upon failure to receive the first heartbeat, using the second command to effectuate an action of the remotely operated submersible.

A feature of the present application further includes receiving a third signal in the remotely operated submersible, the third signal including a third command and a third heartbeat.

Another feature of the present application includes wherein the receiving a first signal, receiving a second signal, and receiving a third signal, occur concurrent with one another.

Still another feature of the present application includes wherein the second signal is a signal sent via WiFi radio, and wherein the third signal is a spread spectrum signal.

Yet another feature of the present application further includes subsequent time to the using the second command, and upon failure to receive the second heartbeat, using the third command to effectuate an action of the remotely operated submersible.

Still yet another feature of the present application includes upon failure to receive the first heartbeat, the second heartbeat, and the third heartbeat, activating an emergency ascent protocol to decrease the depth of the remotely operated submersible.

Yet still another feature of the present application includes wherein the activating includes energizing a recirculating ballast system.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A remotely operated submersible comprising:
a plurality of signal receivers each structured to receive a control transmission through a liquid environment from a remote control station, the control transmission including a command, and wherein each of the plurality of signal receivers use a different communication pathway; and
a controller structured to, upon detection of a detectable heartbeat in the control transmission received by one of the plurality of signal receivers, use the command from the control transmission having the detectable heartbeat to manipulate a system on the remotely operated submersible, the controller being further adapted to generate a command to activate a ballast of the remotely operated submersible in response to a lack of detection of the detectable heartbeat in the control transmission received by each of the plurality of signal receivers.

2. The remotely operated submersible of claim 1, wherein the plurality of signal receivers include a first signal receiver and a second signal receiver, the second signal receiver is a WiFi radio, the WiFi radio being structured to transmit image information to a base station.

3. The remotely operated submersible of claim 2, wherein the image information is a moving image.

4. The remotely operated submersible of claim 2, wherein the plurality of signal receivers further includes a third signal receiver.

5. The remotely operated submersible of claim 4, wherein the third signal receiver is a spread spectrum radio.

6. The remotely operated submersible of claim 5, wherein the control circuit is further structured to use a command from the third signal receiver when controller does not detect the heartbeat in the control transmissions received by the first signal receiver and the second signal receiver.

7. The remotely operated submersible of claim 4, wherein the third control transmission includes a heartbeat.

8. The remotely operated submersible of claim 1, wherein the controller is further adapted to generate a command to activate the ballast at a set period of time after the lack of detection of receipt of any of the heartbeats.

9. The remotely operated submersible of claim 1, wherein the control transmission received by each of the plurality of signal receivers is a redundant of the control transmission received by the other plurality of signal receivers.

10. An apparatus comprising:
a remotely operated submersible having:
a first signal receiver structured to receive a first control transmission through a liquid environment from a remote control station, the first control transmission including a command and a heartbeat;
a second signal receiver structured to receive a second control transmission through the liquid environment from the remote control station, the second control transmission including a command and a heartbeat;
a third control receiver structured to receive a third control transmission through a liquid environment from the remote control station; and
a controller structured to use the command from the first signal receiver or the command from the second signal receiver to manipulate a system of the remotely operated submersible, the controller having a control circuit structured to use the command from the first signal receiver upon receipt of the heartbeat from the first control transmission and use the command from the second signal receiver upon receipt of the heartbeat from the second control transmission when the heartbeat from the first control transmission is no longer received,
wherein the third control receiver is a spread spectrum radio, and
wherein the spread spectrum radio is a firmware only radio, and wherein the remotely operated submersible is configured to concurrently monitor the first control receiver, second control receiver, and the third control receiver.

11. An apparatus comprising:
a robotic drone structured to be operated beneath the surface and within a body of liquid, at least two radio receivers structured to operate within the liquid and for receiving commands from a base station where the commands are used to effectuate an action of the robotic drone within the body of liquid, a first radio receiver structured to receive a first command of the commands and a second radio receiver structured to receive a second command of the commands having control information redundant to the first command, and a control circuit that uses the second command when the first command is determined to be invalid, the control circuit adapted to activate a ballast upon the absence of a detectable heartbeat in the commands.

12. The apparatus of claim 11, wherein the first command is determined to be invalid when a detectable heartbeat of the first command is no longer received from the first radio receiver.

13. The apparatus of claim 12, wherein the second radio receiver is a WiFi radio structured to transmit outbound video images.

14. The apparatus of claim 11, which further includes a third radio receiver structured to operate within the liquid and for receiving commands from a base station where the commands are used to effectuate an action of the robotic drone, the third radio receiver structured to receive a third command of the commands.

15. The apparatus of claim 14, wherein the robotic drone is configured to concurrently monitor the first radio receiver, second radio receiver, and the third radio receiver.

16. The apparatus of claim 14, wherein the third command is redundant to the first command and to the second command, and wherein the control circuit further uses the third command when the first command is determined to be invalid.

17. The apparatus of claim 14, wherein the third radio receiver is a firmware radio, and wherein the control circuit of the first and second command is performed in an electronic circuit that carries out instructions of a computer program, and wherein the control circuit further extends to a hardware based evaluation of a heartbeat received from the third radio receiver.

18. A method comprising:
propelling, by operating one or more motors of a remotely operated submersible, the remotely operated submersible about a liquid coolant contained within an interior of a mechanical housing;
receiving, through the mechanical housing and the liquid coolant, a plurality of signals by the remotely operated submersible, the plurality of signals each including at least a command;
determining if at least one of the plurality of signals includes a detectable heartbeat;
using the command of the plurality of signals determined to have the detectable heartbeat to effectuate an action of the remotely operated submersible within the liquid coolant; and
transmitting, from the remotely operated submersible and through the liquid coolant and the mechanical housing, one or more signals indicating a condition of one or more mechanical structures housed within the mechanical housing.

19. The method of claim 18, wherein the step of receiving the plurality of signals includes receiving a first signal, a second signal, and a third signal in the remotely operated submersible.

20. The method of claim 19, wherein the receiving the first signal, the second signal, and the third signal occur concurrent with one another.

21. The method of claim 20, which further includes, at a subsequent time to determining the lack of the detectable heartbeat in each of the first signal and the second signal, using the command of the third signal to effectuate an action of the remotely operated submersible.

22. The method of claim 19, wherein the second signal is a signal sent via WiFi radio, and wherein the third signal is a spread spectrum signal.

23. The method of claim 18, further including activating, if none of the plurality of signals are determined to have the detectable heartbeat, an emergency ascent protocol to decrease the depth of the remotely operated submersible.

24. The method of claim 23, wherein the activating includes energizing a ballast system.

25. The method of claim 23, wherein the step of activating occurs at a set time after determining the lack of the detectable heartbeat in each of the plurality of signals.

26. The method of claim 18, further including the step of inserting the remotely operated submersible through a hole of the mechanical housing.

27. The method of claim 18, wherein the mechanical housing is a transformer tank.

* * * * *